United States Patent
Blase

[15] 3,670,210
[45] June 13, 1972

[54] ELECTROLYTIC CAPACITOR HAVING A HEAT DISSIPATING CENTER THEREFOR

[72] Inventor: Emil F. Blase, Pickens, S.C.

[73] Assignee: Sangamo Electric Company, Springfield, Ill.

[22] Filed: March 22, 1971

[21] Appl. No.: 126,577

[52] U.S. Cl. .................................... 317/230, 317/260
[51] Int. Cl. .................................................. H01g 9/00
[58] Field of Search.................. 317/230, 232, 233, 243, 260

[56] References Cited

UNITED STATES PATENTS

| | | |
|---|---|---|
| 1,796,855 | 3/1931 | Ahlers..................................317/260 |
| 1,898,789 | 2/1933 | Ringwald..............................317/260 |
| 1,908,962 | 5/1933 | Danziger..............................317/230 |
| 2,049,691 | 8/1936 | Damziger.............................317/230 |
| 2,050,587 | 8/1936 | Ruben..................................317/230 |
| 2,220,887 | 11/1940 | Claassen..............................317/230 |

*Primary Examiner*—James D. Kallam
*Attorney*—Johnson, Dienner, Emrich, Verbeck & Wagner

[57] ABSTRACT

An electrolytic capacitor designed to reduce its internal operating temperatures by incorporating an elongated solid metal arbor into the center of the circular convolute winding. By placing the arbor into thermal contact with the capacitor container and/or an external metallic member, the arbor functions as a heat sink to reduce the operating internal temperature of the capacitor.

10 Claims, 4 Drawing Figures

PATENTED JUN 13 1972
3,670,210
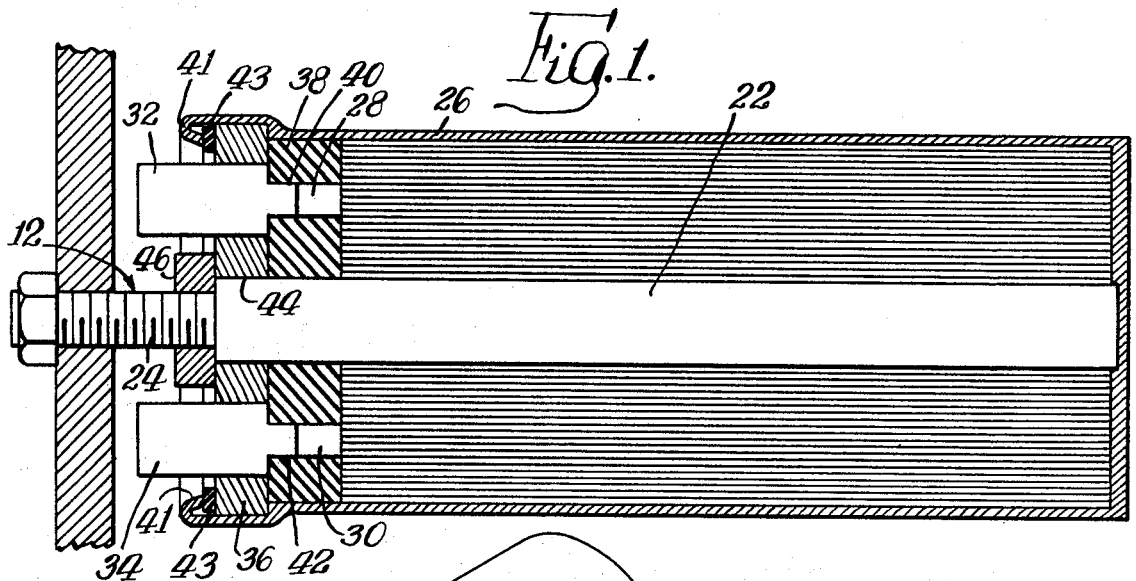
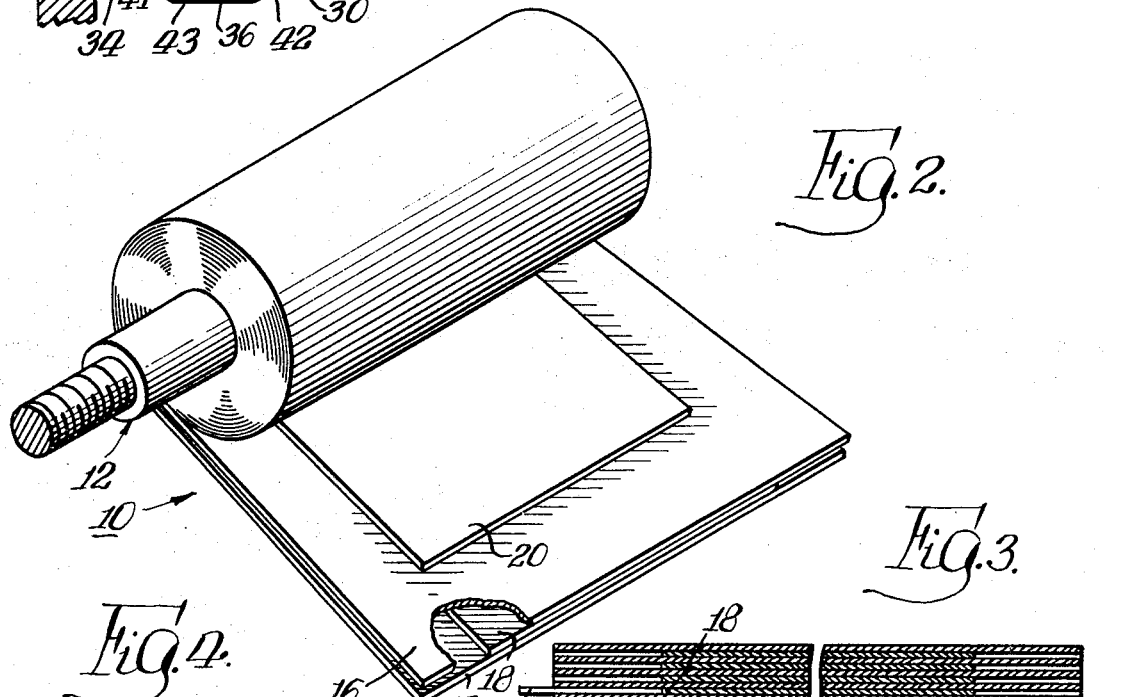
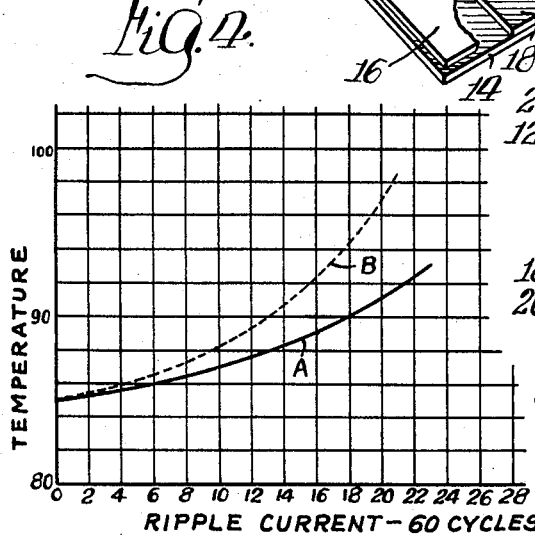
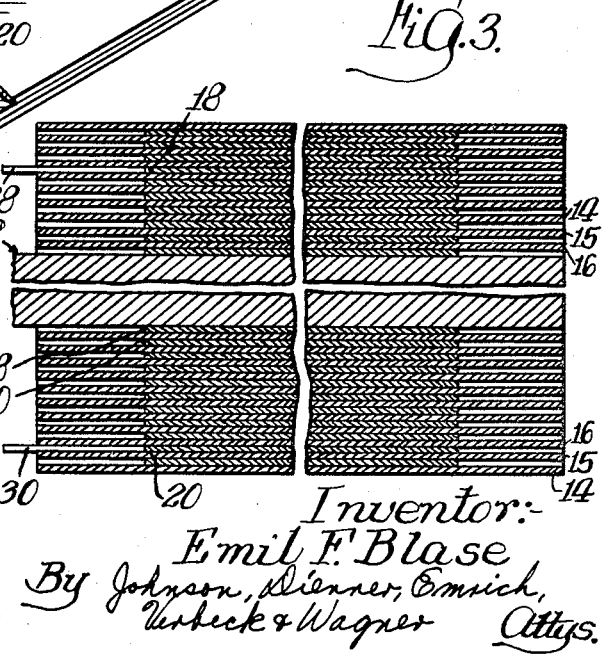
Inventor:-
Emil F. Blase
By Johnson, Dienner, Emrich,
Urbeck & Wagner
Attys.

3,670,210

ELECTROLYTIC CAPACITOR HAVING A HEAT DISSIPATING CENTER THEREFOR

BACKGROUND OF THE INVENTION

This invention relates to electrolytic capacitors, and more particularly, to convolutely wound electrolytic capacitors.

A long recognized problem in the design of electrolytic capacitors is heat buildup which occurs during its operation and shortens capacitor life. High temperatures cause the impregnant to become chemically unstable, and the high temperature condition also has a deleterious effect on the dielectric which can cause a dielectric failure. Because the highest temperatures are reached in the centermost region of convolute windings, it is desirable to provide cooling in the center region of the capacitor. So far, the number of different techniques tried for colling this region have been either ineffective and/or expensive. It is an object of this invention to provide a wound capacitor section having improved heat dissipation characteristics. A further object of this invention is to provide an electrolytic capacitor having a lower operating temperature at the start of the winding with a minimum increase in cost.

SUMMARY OF THE INVENTION

A capacitor constructed in accordance with the principles of this invention includes a circular convolute capacitor section of conventional construction thermal of a pair of electrode foils made up of tantalum, aluminum, or other such film forming metals, one of which is usually anodized to form a dielectric oxide thereon. Between these foils are one or more dielectric spacer materials such as benares, hemp, kraft, etc. Beginning with the unanodized foil itself, or with the dielectric spacer material thereon, the capacitor is convolutely wound on a metal arbor which remains a part of the capacitor section. The arbor is then connected in a heat transfer relation with the capacitor container and/or cover to provide a heat transfer path of high thermal conductivity along the center of the convolute array to a location outside the convolute array.

In the preferred embodiment the arbor is made from a solid metal in the shape of a cylindrical rod with a threaded end portion. The threaded end portion projects through and outwardly of the cover where it is adapted to be connected to a metallic support member to further increase the heat dissipation from the capacitor section.

DESCRIPTION OF DRAWING

For a better understanding of this invention, reference may be made to the accompanying drawing, in which:

FIG. 1 is a longitudinal sectional view of an electrolytic capacitor, embodying the present invention;

FIG. 2 is a front perspective view of the wound capacitor section of the electrolytic capacitor of FIG. 1, partially disassembled and partially fragmentary;

FIG. 3 is an enlarged fragmentary longitudinal section view thereof; and

FIG. 4 is a graph illustrating the variation in the internal temperature for incremental increases in ripple current of a capacitor constructed in accordance with the invention and illustrated in solid line, and a similar graph for a conventional capacitor illustrated in broken line.

DESCRIPTION OF PREFERRED EMBODIMENT

Referring to FIGS. 2 and 3, there is shown a circular convolutely wound capacitor section 10 comprising a cylindrical arbor or core member 12 upon which capacitor electrodes and dielectric separators are helically wound. The capacitor electrodes are formed by a pair of first and second metal bands or foils 18 and 20, which are interspersed between two separator sheets 14 and 16. Prior to the winding operation, the layers are arranged in the relative position which they are to assume during the winding operation and finished section. As shown in FIG. 2, the capacitor section 10 is wound with the foils 18 and 20 in a non-extended relation relative to the separator sheets 14 and 16 so that the foils 18, 20 are within the opposed lateral edges of the separators 14, 15 and 16. However, it is understood that the foil in contact with the arbor could be extended beyond the dielectric spacers to touch the bottom of the can, thus aiding heat transfer additionally.

The arbor 12 is constructed from a solid material having good thermal conducting properties, such as aluminum, and is formed in the shape of a cylindrical rod 22 having a threaded end portion 24. The arbor 12 also serves as a winding mandrel for winding the capacitor layers into a circular convolute configuration. The winding operation can be performed on a winding machine of known construction after the foils have been clamped in the position shown in the drawing. For good heat transfer to the arbor 12, the inner end of metal foil 20 may be in direct thermal contact across its width with rod portion 22.

The wound capacitor section 10 is placed into an open-ended capacitor can 26, which could be made of metal or plastic, with the threaded end portion 24 extending outwardly of the open end. Tap straps 28 and 30 interconnect, respectively, capacitor electrodes 18 and 20 and threaded terminal posts 32 and 34 carried by the cover 36, at least one of which is insulated therefrom. An insulator circular spacer 38 having two openings 40 and 42 for providing a passageway, respectively, for tap straps 28 and 30 and terminals 32 and 34, and the openings 40 and 42 are counterbored for seating the inner ends of terminal posts 32 and 34. The cover 36 is retained at the upper edge of the container 26 by virtue of the downturned lip portion 41 and a liquid-tight seal is provided by using rubber gasket 43. The assembly is impregnated and aged in the conventional manner.

The arbor 12, which extends through a center opening 44 of cover 36, is secured to cover 36 by means of tightening nut 46 on the threaded portion 24 against the cover. Also, cement may be spread around opening 44 to provide a firm hold and to seal off the opening 44. It is noted that arbor 20 is in direct thermal contact with the container 26 at its inner end and with cover 36 at its outer end. Thus, by making the arbor and either the cover or container, or both, of a good heat conducting material, it will be appreciated that an external path for the dissipation of heat from the center of the capacitor section 10 is provided. Very satisfactory results have been attained by using a solid aluminum rod for arbor 12 and aluminum cover 36.

The internal heat generated in electrolytic capacitors increases with an increase in the passage of A.C. ripple current in the capacitor. Thus, it is possible to compare the internal heat characteristics of two different electrolytic capacitors by plotting a graph of their temperature vs. A.C. ripple. Such a graph is depicted in FIG. 4, where the solid line marked A is the plot of a capacitor constructed in accordance with the principles of this invention, an the broken line marked B is the plot of an electrolytic capacitor without the arbor. It can be seen that curve B rises to dangerously high temperatures for certain given values of ripple current. By contrast, curve A, which has a much slower rising slope, shows that a capacitor constructed according to the concept of the invention will conduct approximately 50 percent more ripple current than the conventional capacitor for the same value of temperature rise. The graphs of FIG. 4 were derived by measuring the temperature at the center of the capacitor section of two electrolytic capacitors identical in construction, except the capacitor of curve A had an internal aluminum arbor and aluminum cover and capacitor of curve B had no internal arbor and a phenolic cover.

Heat dissipation for the capacitor assembly of FIG. 1 may be further enhanced by mounting the threaded potion 24 of the arbor 12 on a metallic support member. That further will assist in the removal of heat.

While only one embodiment of the invention has been shown and described, it will be readily understood by those

I claim:

1. A capacitor including a container and a capacitor section therein, said capacitor section comprising convolutely wound array of layers of dielectric material and interspersed layers of conductive material with the innermost layer being of conductive material, and an arbor of heat conductive material extending through the center of said array for the entire length thereof and in direct contact with said innermost layer, a cover enclosing said container, electrical terminal means connected to said conductive layers and extending through said cover, at least one of said container or said cover being made from a heat conducting material and a heat transfer path of high thermal conductivity extending from the center of said array including one end portion of said arbor in thermal contact with said at least one of said container or said cover.

2. A capacitor as defined in claim 1, wherein said at least one of said container or said cover is a cylindrical metallic housing.

3. A capacitor as defined in claim 1, wherein said at least one of said container or said cover is an aluminum cover.

4. A capacitor as defined in claim 1, wherein said arbor comprises a solid metal rod having one end abutting against a wall of said container and the outer end projecting through an opening in said cover.

5. A capacitor as defined in claim 4, wherein said rod includes a threaded end portion extending outwardly of said cover for mounting said capacitor on a support member to further increase the heat dissipation away from the center of said array.

6. A capacitor including a closed container having an end wall and opposite open end, a cover for said open end and an electrolytic capacitor section therein, said capacitor section comprising convolutely wound array of layers of dielectric material and interspersed layers of conductive material with the innermost layer being of conductive material, and an arbor of heat conductive material, electrical terminal means connected to said conductive layers and extending through said cover, and an arbor of heat conductive material extending through the center of said array in direct thermal contact with said innermost layer and with one end terminating at the end wall opposite said open end of said container and the other end extending through an opening in said cover, at least one of said container or said cover being of a heat conducting material and a heat transfer path of high thermal conductivity extending from the center of said array including one end portion of said arbor in thermal contact with said at least one of said container or said cover.

7. A capacitor as defined in claim 6, wherein said at least one of said container or said cover is a cylindrical metallic housing.

8. A capacitor as defined in claim 6, wherein said at least one of said container or said cover is an aluminum cover.

9. A capacitor as defined in claim 6, wherein said arbor comprises a solid metal cylindrical rod having one end abutting against said end wall of said container and having a reduced diameter portion at its other end projecting through an opening in said cover.

10. A capacitor as defined in claim 9, wherein said reduced diameter portion extends outwardly of said cover and is threaded for mounting the capacitor on a metallic support member to further increase the heat dissipation away from the center of said array.

* * * * *